Nov. 29, 1960 M. MAY 2,961,694
DOOR HANDLE ASSEMBLY
Filed July 9, 1957
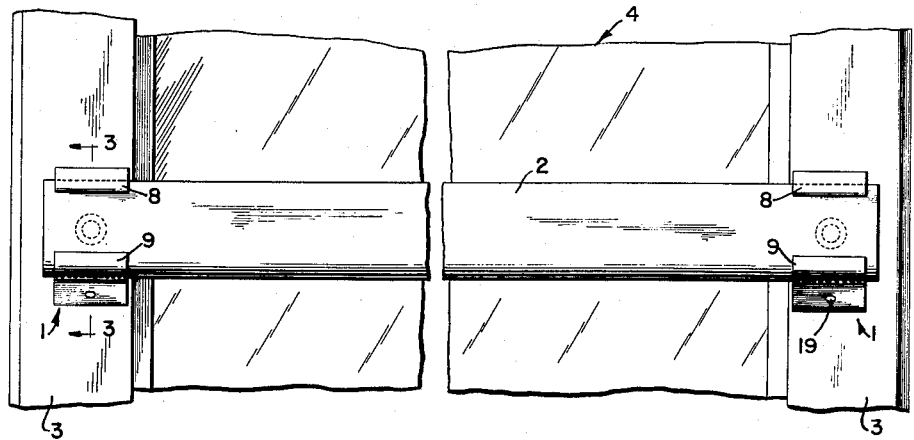
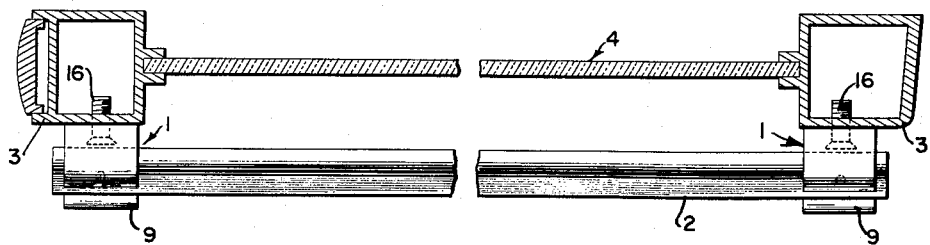
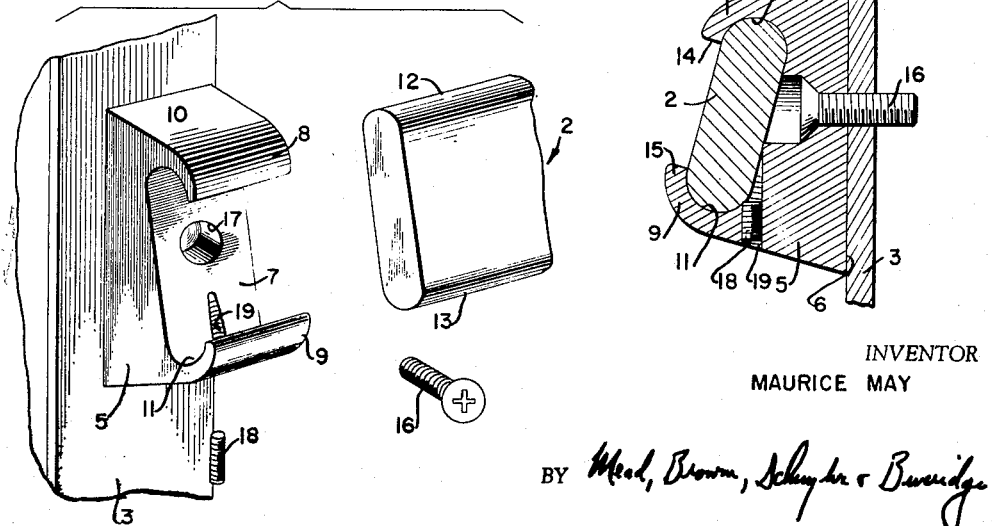
INVENTOR
MAURICE MAY
BY *Mead, Brown, Schuyler & Burridge*
ATTORNEY

United States Patent Office 2,961,694
Patented Nov. 29, 1960

2,961,694

DOOR HANDLE ASSEMBLY

Maurice May, Atlanta, Ga., assignor to American Art Metals Company, Atlanta, Ga., a corporation of Delaware Filed July 9, 1957, Ser. No. 670,806

5 Claims. (Cl. 16—111)

This invention relates to a door handle assembly and more particularly to a push bar handle assembly for a door.

It is an object of the present invention to provide a new and improved push bar door handle assembly including a push bar which is securely retained in place during use but which may be readily removed and replaced if desired.

It is another object of the present invention to provide such a handle assembly which is of pleasing appearance in the sense that connecting screws or the like are effectively concealed from view by component parts of the assembly.

Briefly described, a preferred embodiment of the present invention comprises a pair of horizontally spaced apart brackets of similar size and shape and a push bar extending between and supported by each bracket. Each bracket comprises a body portion having a flat rear face for mounting on a door frame and an upper projection and a lower projection extending outwardly from the body portion. The upper and lower projections are preferably of hook-like shape in cross section with the lower projection being spaced farther from the rear face of the body portion than the upper projection to provide a bracket recess or opening which is tilted back from the vertical whereby a push bar having a cross section complementary to the cross section of the bracket recess or opening may lie at an angle to the vertical determined by the tilt of the bracket recess.

The push bar is assembled with the brackets by sliding the bar horizontally with respect to the bracket recesses until the bar is in its desired position. The bar is then retained securely in place by means of set screws positioned in each bracket adjacent the lower projection of each bracket so that when each set screw is tightened it wedges the bar securely in place within the associated recess. Both the set screws and mounting screws for the brackets are concealed from view from the front by the push bar when the push bar is in assembled position with respect to the bracket, thus giving an assembly which is pleasing in appearance in the sense that no visible connecting members are exposed.

These and other objects of the present invention will become more apparent from the following detailed description taken in conjunction with the attached drawing, wherein:

Fig. 1 is a front elevational view of a push bar door handle assembly according to the present invention, said view being broken away in part and including a portion of a door frame upon which said handle assembly is mounted;

Fig. 2 is a top view of the door handle assembly shown in Fig. 1 with the door frame portion being shown in section;

Fig. 3 is a cross-sectional view taken on line 3—3 of Fig. 1; and

Fig. 4 is an exploded view showing components of the door handle assembly.

Referring now to Figs. 1 and 2 of the drawing, a preferred embodiment of a push bar door handle assembly according to the present invention is shown as comprising a pair of horizontally spaced apart brackets, each designated generally by the reference numeral 1, and a push bar 2 supported by and extending between said brackets. Brackets 1 are shown as being mounted on frame members 3 of a door generally indicated by the reference numeral 4. The door handle assembly shown has particular utility in connection with metal doors made of aluminum frame members. When used with such a door, both the brackets and the push bar are preferably made of aluminum.

Since both brackets are the same in size and shape, only one is described in detail, it being understood that said description is equally applicable to the other bracket. Referring to Figs. 3 and 4, it is seen that each bracket comprises a body portion 5 having a flat rear face 6 adapted to be positioned against and mounted on a door frame 3. Body portion 5 also has a sloped front face 7, as shown more particularly in Fig. 4, which makes an acute angle with flat rear face 6 as shown in both Figs. 3 and 4. As thus shown, face surface 7 slopes upwardly and inwardly from the bottom portion of the bracket.

Curved hook-like upper and lower projections 8 and 9 extend outwardly from bracket body portion 5 as shown in Figs. 3 and 4. Projection 8 has a curved inner surface 10 and projection 9 has a similarly curved inner surface 11 disposed opposite surface 10 as shown best in Fig. 3. Curved surfaces 10 and 11 define, together with bracket surface 7, an elongated recess or opening having a tilt or slant corresponding to that of bracket surface 7. It is thus evident that projection 9 is spaced farther from the flat rear surface 6 of the bracket than is projection 8.

Push bar 2 has a cross-sectional shape such that the push bar is adapted to fit snugly within the recess or opening defined by curved surfaces 10 and 11 and bracket surface 7. Hence, push bar 2 has curved upper and lower edge surfaces 12 and 13 which seat, respectively, in curved inner surfaces 10 and 11. The front and rear surfaces of the push bar are flat whereby the rear surface may lie against bracket surface 7. When the push bar is positioned in a bracket, the push bar will have a tilt or slant corresponding to that of the recess in which it is received, or, to put it another way, corresponding to the tilt or slant of bracket surface 7. This is a convenient slant for gripping the push bar. The opposed ends 14 and 15 of bracket projections 8 and 9 are spaced so that the front surface of the push bar is exposed when the push bar is retained by the bracket.

Each bracket is preferably attached with respect to a door frame 3 or the like by an attaching screw or bolt 16 which is seated in an opening 17 extending through body portion 5 of the bracket whereby screw 16 may be threaded into or bolted with respect to door frame 3 to hold the flat rear face 6 of the bracket securely against the door frame as shown in Figs. 2 and 3. Opening 17 is so shaped that the head of retaining screw 16 is received within the opening and thus does not interfere with placement of the push bar in the bracket. It is apparent that both the retaining screw 16 and opening 17 are concealed by the push bar when it is in position in the bracket.

Push bar 2 is releasably retained within the brackets by means of set screws 18 located in passages 19, said set screws engaging the push bar as shown in Fig. 3. Each set screw passage 19 is a circular passage having its longitudinal axis preferably parallel to rear face 6 of the bracket as shown in Fig. 3. Also, each passage 19 preferably extends through the body portion 5 of the bracket from the lower surface of the bracket adjacent lower projection 9, as shown in Fig. 3, to bracket surface 7, where, due to the inclination of surface 7, the upper end portion of passage 19 is a trough-shaped recess in inclined surface 7 as shown in Fig. 4. Thus, in drilling (for example) the bracket to make a set screw opening, it will be readily apparent that, where the drilling is done in a direction parallel to rear surface 6 and starts from the lower surface of the bracket adjacent lower projection 9 (see Fig. 3), the drilled opening will terminate in an elongated recess in surface 7 due to the inclination shown of this surface.

When push bar 2 is seated within brackets 1 as shown in Figs. 1–3, the push bar is located with respect to set screw passages 19 so that the push bar may, in effect, be wedged in place in each bracket by the set screw 18 associated with the bracket. Thus, referring to Fig. 3, the location of set screw passage 19 in relation to push bar 2 is such that when set screw 18 is tightened, the upper end of the set screw engages a lower corner portion of the push bar (located at the juncture between surface 7 and projection 9 as shown in Fig. 3) to urge the push bar outwardly against end 15 of projection 9 and upwardly against surface 10 of the upper bracket projection 8. This insures that the push bar is retained firmly in position and will not slip or rattle when in service. Moreover, the location of set screw passage 19 is such that set screw 18 is effectively concealed from view from the front, thus adding to the overall appearance of the handle assembly. When each set screw 18 is removed or released so that it does not engage the push bar, the latter may be slid endwise so as to free the push bar from the bracket.

It will thus be seen that the present invention provides a push bar door handle assembly wherein the push bar is mounted so as to be readily removable and yet, when it is in its intended position for use, it is retained securely against becoming loose. The overall construction of the handle assembly is such that it has a pleasing appearance, this being contributed to by the fact that the means for attaching the handle assembly to a door frame is effectively concealed from view and the means for retaining the push bar securely in place against removal from the assembly is also effectively concealed.

While the push bar will normally be supported by two brackets so as to be parallel to the door front with which it is associated, it may, if desired, be disposed at an angle to the door front so that one end of the push bar is spaced farther from the door front than is the other edge. In such a case, only one bracket of the type shown and described above need be employed, the other end of the push bar being attached with respect to the door in any desired manner.

While I have shown and described a preferred embodiment of my invention, I wish it to be understood that I do not intend to be restricted solely thereto but that I do intend to cover all modifications thereof which would be apparent to a person skilled in the art and which come within the spirit and scope of my invention.

What I claim as my invention is:

1. A push bar door handle assembly comprising a pair of horizontally spaced apart brackets, each of said brackets including a body portion having a flat rear surface adapted to be mounted on a door, a front surface, and spaced apart opposed upper and lower hook-like projections extending from said body portion toward each other and defining, together with said front surface, a recess in said bracket, means for positioning said brackets on a door so that said recesses are in horizontal alignment with each other, a push bar slidably received in said recesses, said push bar having a cross-sectional area of substantially the same shape and size as the cross-sectional area of each recess, said body portion having a set screw opening extending therethrough and intersecting said front surface within said recess adjacent one of said projections, and a set screw releasably positioned in each set screw opening and having an end portion wedged against a corner surface of said push bar, each set screw end portion being located between said push bar and said bracket body portion to urge said push bar outwardly with respect to said bracket body portion and against said projections to retain said push bar firmly in place within said bracket recesses, each set screw end portion being concealed by said push bar door handle assembly.

2. A push bar door handle assembly according to claim 1, wherein each of said projections is a curved projection, and each bracket body portion includes means accessible through the space between said upper and lower projections for mounting the flat rear surface of the body portion on a door, said mounting means being concealed from view from the front by said push bar.

3. A push bar door handle assembly comprising a pair of horizontally spaced apart brackets, each of said brackets including a body portion having a flat rear surface for mounting on a door, a flat front surface inclined at an acute angle with respect to said flat rear surface, and spaced apart upper and lower opposed hook-like projections extending outwardly from said body portion toward each other and defining, together with said inclined flat front surface, a recess within said bracket, said lower projection being located farther from the flat rear surface of said body portion than said upper projection, each bracket body portion including means accessible through the space between said upper and lower projections for mounting the flat rear surface of the body portion on a door, a push bar slidably received in said recesses, said push bar having a cross sectional area of substantially the same shape and size as the cross sectional area of each recess, a set screw opening extending from the lower surface of each bracket and intersecting said inclined front surface adjacent said lower projection, and a set screw positioned in each set screw opening and having an upper end wedged against said push bar, said set screw upper end being located between said push bar and said bracket body portion to urge said push bar outwardly with respect to said bracket body portion against said projections to retain said push bar firmly in place, each set screw upper end and the means for mounting the flat rear surface of each bracket body portion on a door being concealed by said push bar from view from the front of said push bar door handle assembly.

4. In a push bar door handle assembly, a bracket including a body portion having a flat rear surface adapted to be mounted on a door, a front surface, and spaced apart opposed upper and lower hooklike projections extending from said body portion toward each other and defining, together with said front surface, a recess in said bracket, a push bar slidably received in said recess, said push bar having a cross-sectional area substantially the same shape and size as the cross-sectional area of said recess, said body portion having a set screw opening extending therethrough to intersect said front surface adjacent one of said projections, and a set screw releasably positioned in said set screw opening and having an end portion projecting from said opening into said recess in wedging engagement against said push bar, said set screw end portion being located between said push bar and said bracket body portion to urge said push bar outwardly against said projections to retain said push bar firmly in place within said recess, said set screw end portion being concealed by said push bar from view from the front of said push bar door handle assembly.

5. In a push bar door handle assembly, a bracket including a body portion having a flat rear surface adapted to be mounted on a door, a flat front surface on said bracket inclined with respect to said rear surface, and spaced apart upper and lower projections extending forwardly from said body portion and curved toward each other to define, together with said inclined front surface, a recess in said bracket, said lower projection being located farther from the flat rear surface of said bracket body portion than said upper projection, said projections being curved to provide a seat for a push bar with said seats in opposed relationship to each other, a push bar located in said recess, said push bar having curved edges complementary to the curved seats in said projections and slidably engaged therewith, said body portion having a set screw opening extending through said body portion to intersect said inclined front surface within said recess adjacent said lower projection, and a set screw releasably positioned in said set screw opening and having an end portion projecting from said opening into wedging engagement against a lower curved edge of said push bar and biasing said push bar outwardly against lower projection and upwardly against said upper projection to retain said push bar firmly in place within said recess, said set screw being concealed by said push bar from view from the front of said push bar door handle assembly.

References Cited in the file of this patent

UNITED STATES PATENTS

| | | |
|---|---|---|
| 546,507 | Christmann | Sept. 17, 1895 |
| 1,484,406 | Ottinger | Feb. 19, 1924 |
| 2,218,752 | Johnson | Oct. 22, 1940 |
| 2,576,511 | Jewett | Nov. 27, 1951 |
| 2,580,909 | Gordon | Jan. 1, 1952 |
| 2,677,852 | Jain | May 11, 1954 |

FOREIGN PATENTS

| | | |
|---|---|---|
| 433,085 | Great Britain | Aug. 8, 1935 |
| 547,659 | Great Britain | Sept. 4, 1942 |
| 582,577 | Great Britain | Nov. 21, 1946 |